(12) United States Patent
Cardinale

(10) Patent No.: US 11,267,640 B2
(45) Date of Patent: Mar. 8, 2022

(54) FOLD SEAM AND CUT FORMATION FOR INSULATION FOR BOXES

(71) Applicant: Sal Jack Cardinale, Mill Valley, CA (US)

(72) Inventor: Sal Jack Cardinale, Mill Valley, CA (US)

(73) Assignee: SC Marketing Group Incorporated, Mill Valley, CA (US)

( * ) Notice: Subject to any disclaimer, the term of this patent is extended or adjusted under 35 U.S.C. 154(b) by 313 days.

(21) Appl. No.: 16/394,583

(22) Filed: Apr. 25, 2019

(65) Prior Publication Data

US 2019/0248572 A1 Aug. 15, 2019

(51) Int. Cl.
*B65D 81/38* (2006.01)

(52) U.S. Cl.
CPC ..... *B65D 81/3823* (2013.01); *B65D 81/3851* (2013.01); *B65D 81/3876* (2013.01)

(58) Field of Classification Search
CPC ........... B65D 81/3876; B65D 81/3813; B65D 27/02; B65D 77/24; B65D 2519/00432; B65D 2575/54; B65D 2571/00808
USPC ....................................................... 206/408
See application file for complete search history.

(56) References Cited

U.S. PATENT DOCUMENTS

| | | | | |
|---|---|---|---|---|
| 3,565,320 | A * | 2/1971 | Osborne | B65D 5/5097 229/120.02 |
| 5,775,571 | A * | 7/1998 | Edelman | B65D 5/12 229/108.1 |
| 9,526,364 | B1 * | 12/2016 | Lovison | B65D 81/3886 |
| D840,765 | S * | 2/2019 | Cabay | D7/624.2 |
| 2008/0047967 | A1 * | 2/2008 | Brunner | B65D 81/3886 220/737 |
| 2018/0237573 | A1 * | 8/2018 | Tabor | C08G 18/7671 |

* cited by examiner

*Primary Examiner* — Steven A. Reynolds
*Assistant Examiner* — Javier A Pagan
(74) *Attorney, Agent, or Firm* — Steven A. Nielsen; www.NielsenPatents.com

(57) ABSTRACT

Foldable insulation systems may comprise recyclable materials fabricated for ease of insertion into a typical box. Disclosed embodiments include the use of polyester fill encased or covered with a clear membrane or other surface material. Disclosed embodiments eschew the current trend of using biodegradable materials. The use of biodegradable materials represents a new found shortfall in the art as few useful insulation materials are biodegradable within a reasonable period of time. The disclosed insulation systems overcome shortfalls in the art by using polyester type materials that often achieve a number "1" value for recycling. Disclosed embodiments may be comprised of virgin resin or more common material such as recycled bottles and other recycled polymers, polyesters, polypropylenes and similar materials. Disclosed systems include a relatively flat insulation member that may be disposed or attached to the top of a box or other container.

6 Claims, 8 Drawing Sheets

FOLD SEAM AND CUT FORMATION FOR INSULATION FOR BOXES

CROSS-REFERENCE TO RELATED APPLICATIONS

This utility patent application claims the benefit and priory date of provisional patent application 62/662,368 filed on Apr. 25, 2018. This application is also a continuation in part (CIP) of patent application Ser. No. 15/442,526 filed on Feb. 24, 2017 which claims the benefit and priority date of provisional patent application 62/299,471 filed on Feb. 12, 2016.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to foldable insulation systems. More particularly, the invention relates to means and methods of creating recyclable inserts for use in boxes and other packaging or containers, with the inserts taking a sleeve configuration or box configuration.

(2) Description of the Related Art

The known related art fails to anticipate or disclose the principles of the present invention.

In the related art. U.S. Published Patent Application US2005/0189404 by Xiaobai et al discloses an insulation panel system that comports to boxes. But, the Xiaobai system fails to provide a shipping sleeve or to fold to a flat state for storage.

In the related art, U.S. Pat. No. 5,269,602 issued to Kuwahara et al on Dec. 14, 1993 discloses a thermal insulation box wherein thermal insulation material is injected into wall compartments. Kuwahara fails to provide a sleeve type structure or practical means of recycling or retrieving insulation components.

U.S. Pat. No. 2,998,337 issued to Tillotson on Aug. 29, 1961 discloses a reflective and fibrous type of insulation made of mineral wool and similar materials. The insulation of Tillotson does not fold well into a box and has not sleeve type configuration. Moreover, the Tillotson insulation is not recyclable.

U.S. Published Patent Application No. 20110253773 by Lozier and published on Oct. 20, 2011 discloses an insulated pizza box. The pizza box of Lozier fails to provide means of manufacture or use of a separate insulation piece that may be used as a shipping sleeve.

U.S. Published Patent Application No. 20080260303 by De Lesseux et al discloses an insulated shipping bag with an insert system. Unfortunately, the bag and insert are not well suited for traditional shipping in boxes or other closed containers.

U.S. Pat. No. 5,129,519 issued to David et al on Jul. 14, 1992 discloses a packaging container with inner and outer walls. Unfortunately, David container fails to provide insulation upon or near the six sides of a traditional container and fails to provide a sleeve type configuration.

Thus, there is a long felt need in the art for the present invention.

BRIEF SUMMARY OF THE INVENTION

The present invention overcomes shortfalls in the related art by providing a recyclable product executed in a unique seam and cut formation such that the disclosed embodiments may act has both an insulation sleeve and provide a rapid deployment for expansion to insulate traditional boxes.

The disclosed embodiments overcome shortfalls in the related art by providing flat storage, ease of manufacture and a composition of pure recyclable material.

The present invention overcomes shortfalls in the related art by presenting an unobvious and unique combination and configuration of methods and components to create a recyclable, flexible and versatile insulation structure that is well suited for on demand sleeve insulation and rapid expansion for insertion into shipping boxes and other containers.

The invention overcomes shortfalls in the related art by using recyclable materials fabricated for ease of insertion into a typical box. Disclosed embodiments include the use of polyester fill encased or covered with a clear membrane or other surface material. Disclosed embodiments eschew the current trend of using biodegradable materials. The use of biodegradable materials represents a new found shortfall in the art as few useful insulation materials are biodegradable within a reasonable period of time.

Disclosed embodiments overcome shortfalls in the art by using polyester type materials that often achieve a number "1" value for recycling. Disclosed embodiments may be comprised of virgin resin or more common material such as recycled bottles and other recycled polymers, polyesters, polypropylenes and similar materials.

Disclosed embodiments overcome shortfalls in the art by providing a relatively flat insulation member that may be disposed or attached to the top of a box or other container. The disclosed box wings may be fastened downwardly to further secure the workpiece.

These and other objects and advantages will be made apparent when considering the following detailed specification when taken in conjunction with the drawings.

Figure 1:
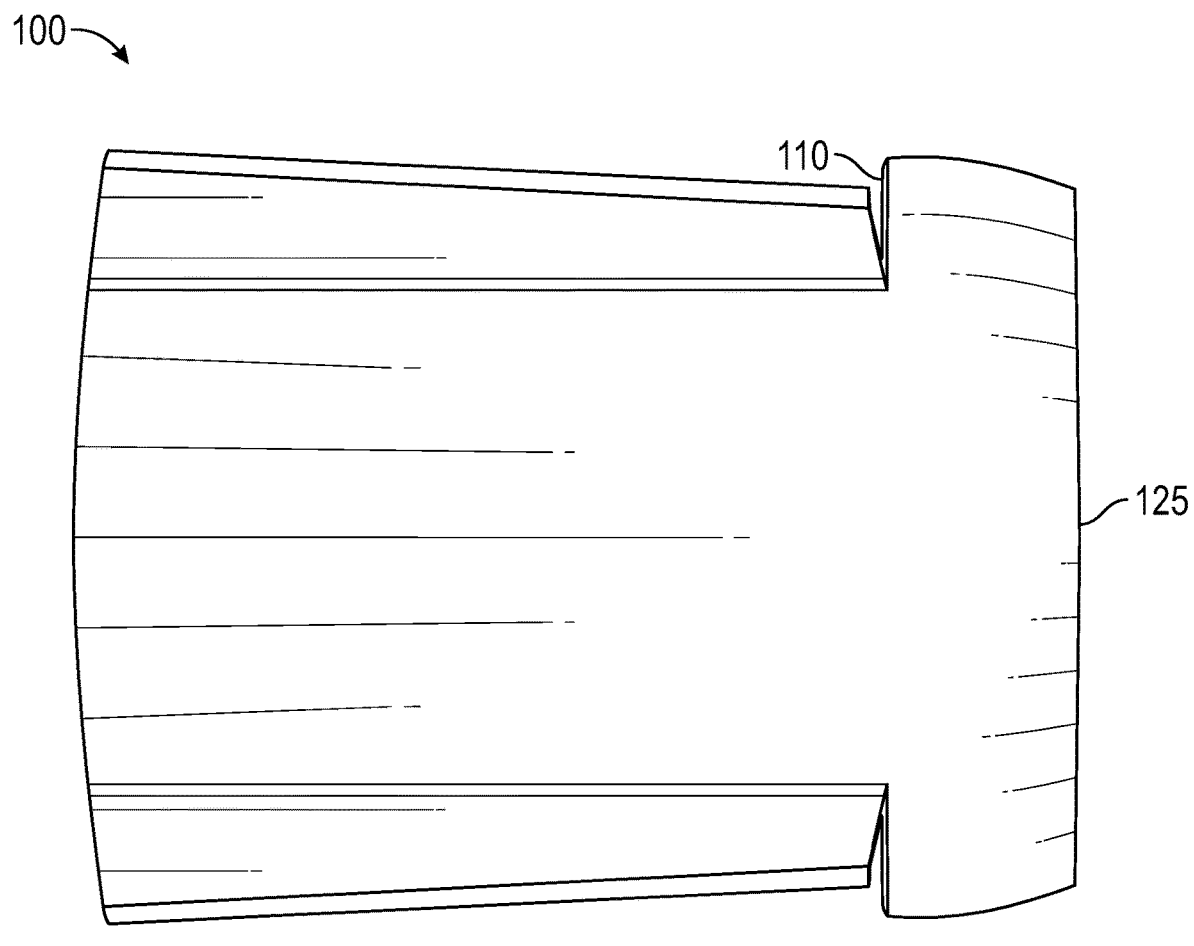
FIG. 1 depicts a top view of a disclosed embodiment in a flat or sleeve configuration

REFERENCE NUMERALS IN THE DRAWINGS 100 disclosed embodiment in general
110 box wing void
120 lower fold assembly
125 bottom fold
130 box wing
140 upper fixed seam
150 upper edges
160 upper void defined by the upper edges 150
200 container

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

FIG. 1 depicts a disclosed embodiment 100 disposed in a compact or folded position and having a pair of box wing voids 110 or cuts. The box wing voids 110 are defined by lower sections of the embodiment. The lower sections of the embodiment may include a bottom fold. In an unfolded position, the bottom fold flattens and may be disposed in the bottom of a container or box.

Figure 2:
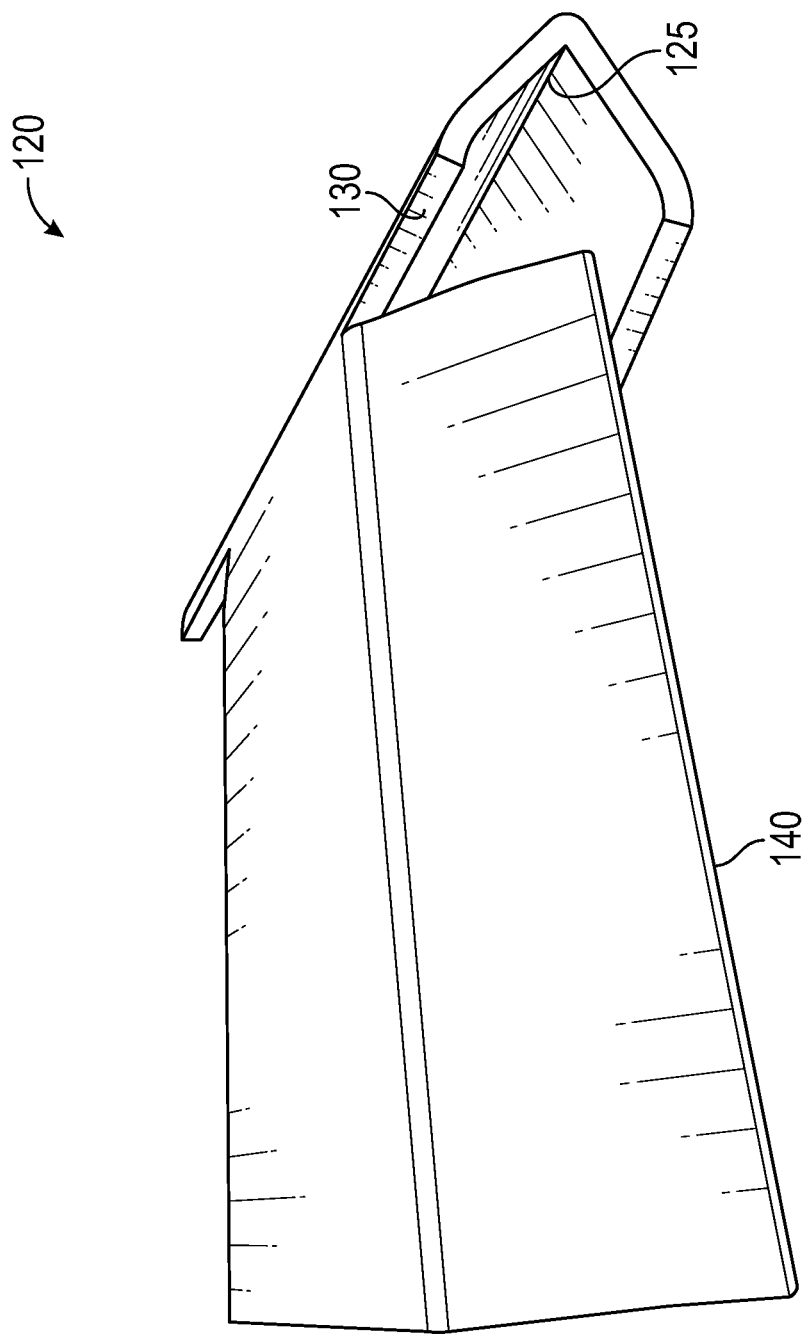
FIG. 2 depicts an isometric view of a disclosed embodiment in a partially open position

FIG. 2 depicts a disclosed embodiment comprising a lower fold assembly 120 with the lower fold assembly comprising a bottom fold 125. The bottom fold assembly in conjunction with the bottom fold 125 and box wing void 110 (shown in FIG. 1) may comprise a pair of box wings 130 (as shown in FIG. 4)

Figure 3:
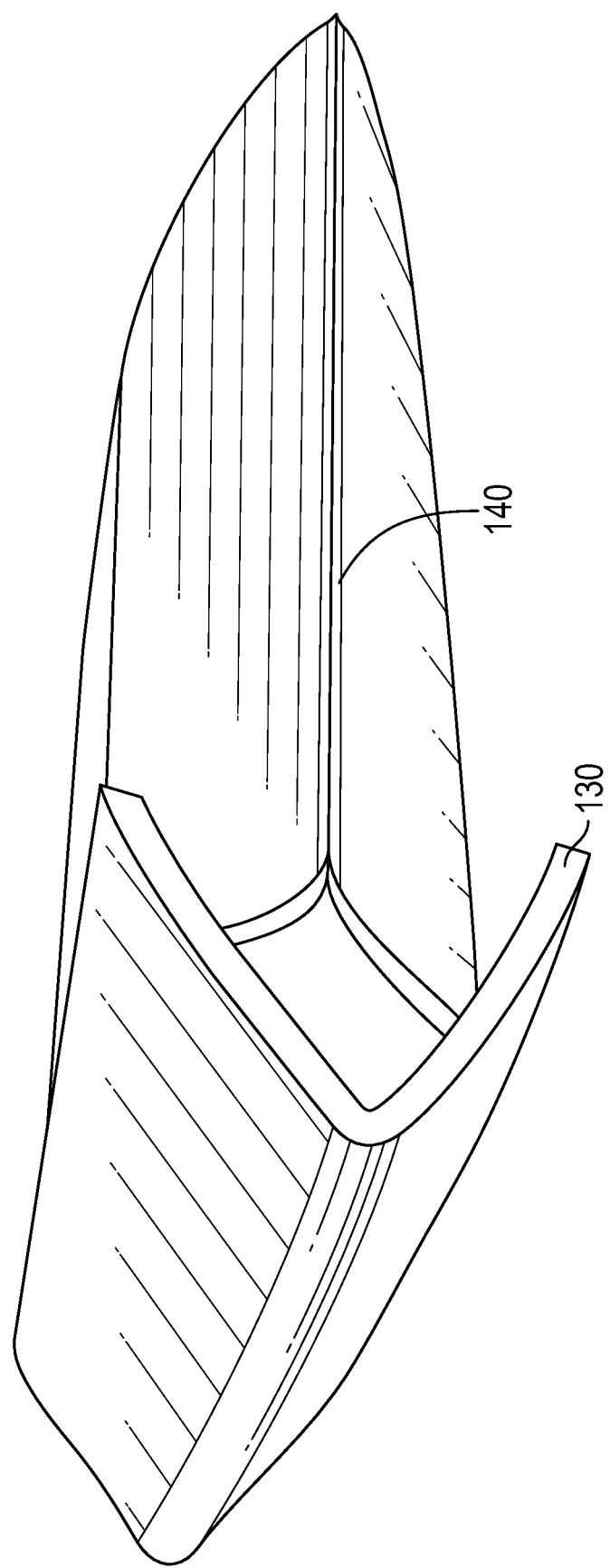
FIG. 3 depicts an isometric view of a disclosed embodiment in a partially open position

FIG. 3 depicts a disclosed embodiment comprising a partially opened box wing 130 and an upper fixed seam.

Figure 4:
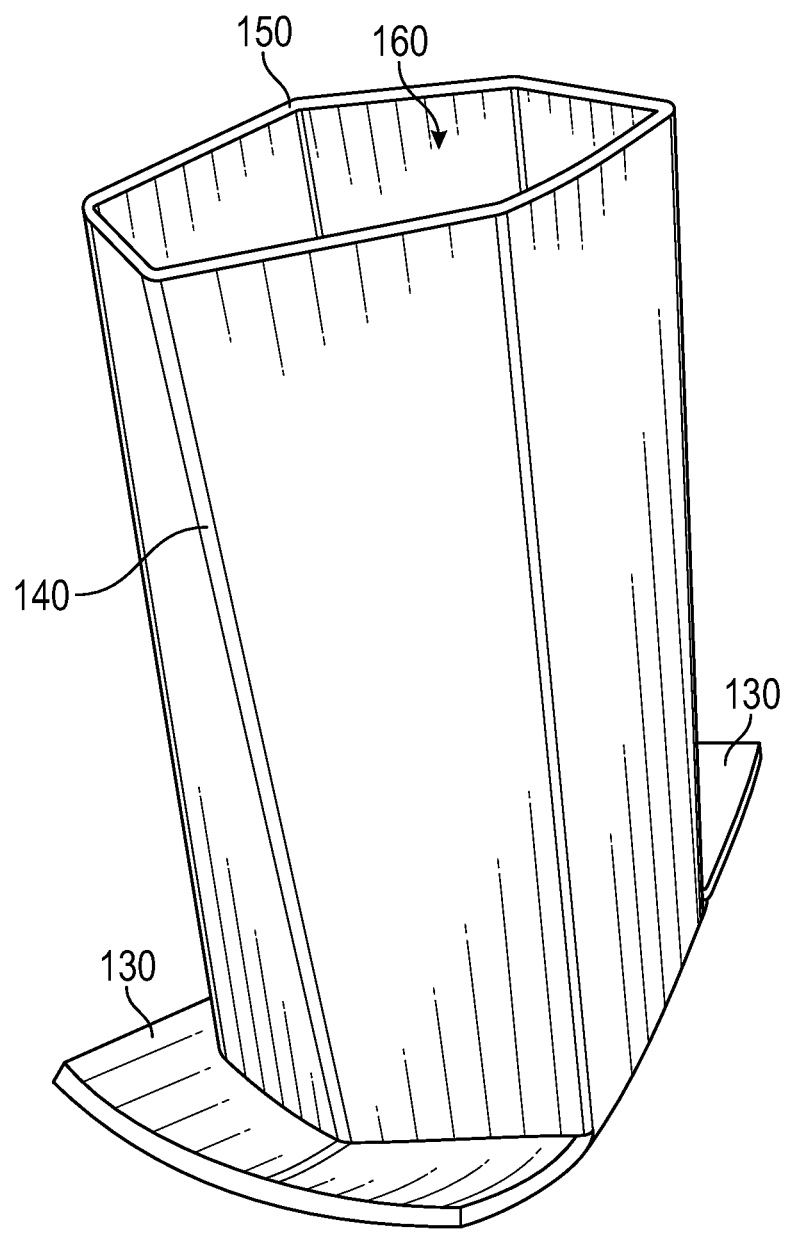
FIG. 4 depicts an isometric view of a disclosed embodiment in a free standing position with box wings in a flat position

FIG. 4 depicts a disclosed embodiment comprising an upper void 160 defined by upper edges 150. The upper void 160 expands as the embodiment is expanded from a sleeve position to a box configuration. A disclosed embodiment may have two upper seams 140 that may span from the upper edges 140 to the box wing void. In a self supporting position, two box wings 130 may be disposed in a flat position in a plane perpendicular to the main body or upper seams of the device.

Figure 5:
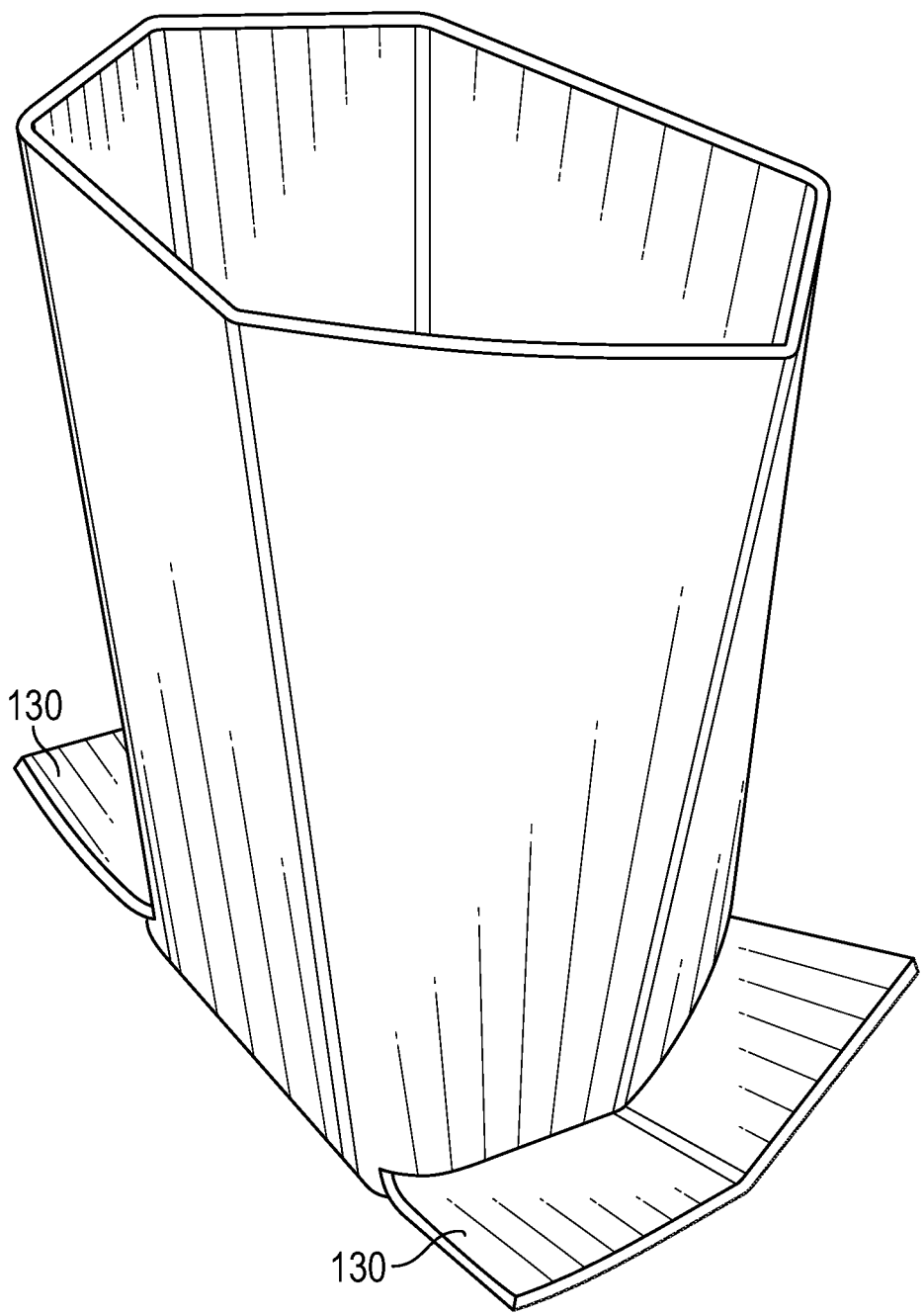
FIG. 5 depicts an isometric view of a disclosed embodiment in a free standing position with box wings in a flat position

FIG. 5 depicts a rotated view of FIG. 4 and further depicts two box wings 130 in an opened or expanded position, prior to insertion into a container.

Figure 6:
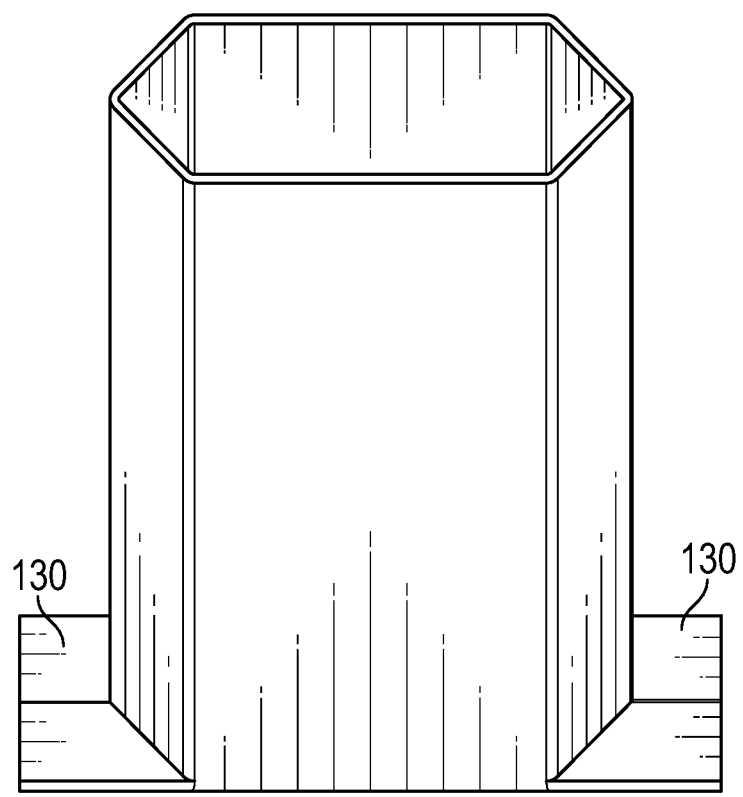
FIG. 6 depicts an isometric view of a disclosed embodiment in a free standing position with box wings in a flat position

FIG. 6 depicts a disclosed embodiment showing two box wings 130 on either side with the box wings ready to be folded into a box or other container.

FIG. 6 depicts a box 200 or other container receiving a disclosed embodiment having two folded box wings 130 and an open upper void 160.

Figure 7:
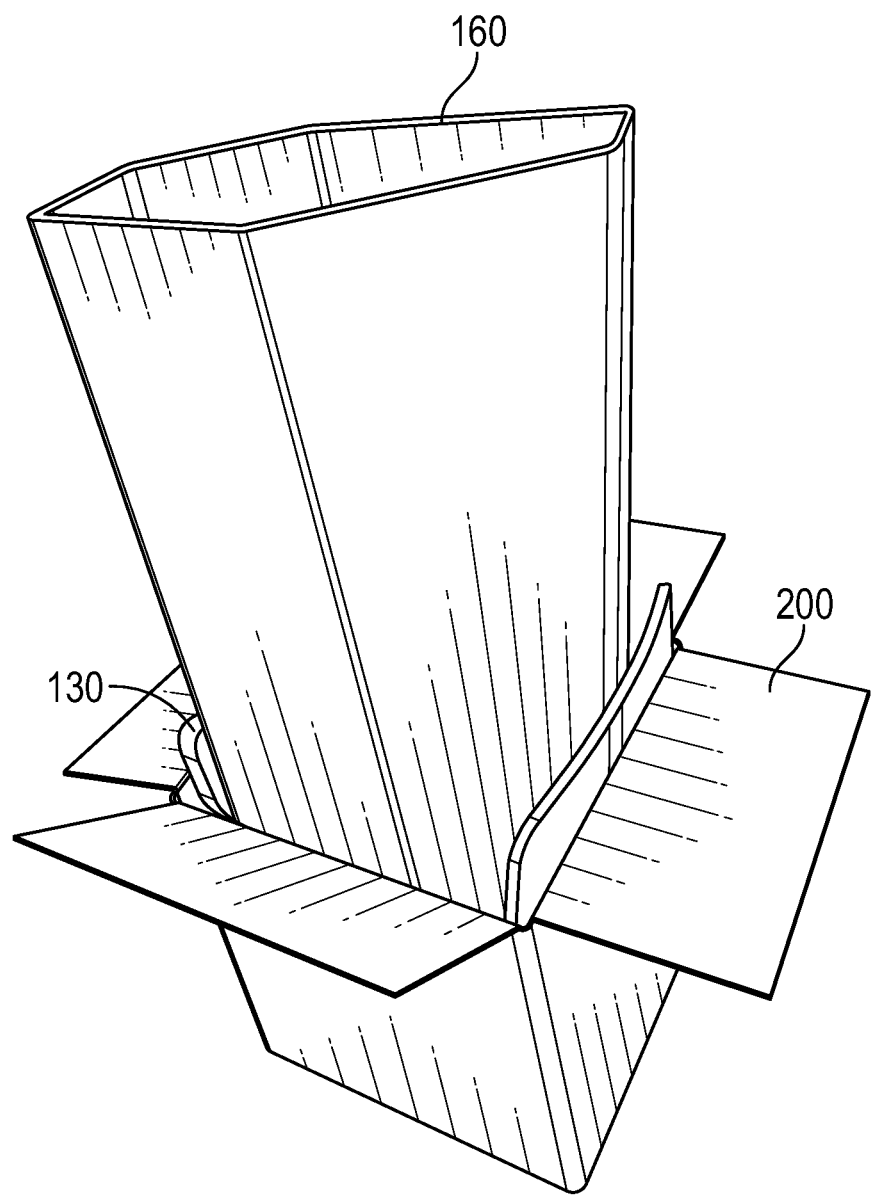
FIG. 7 depicts an isometric view of a disclosed embodiment with box wings retracted and the embodiment partially disposed within a box
Figure 8:
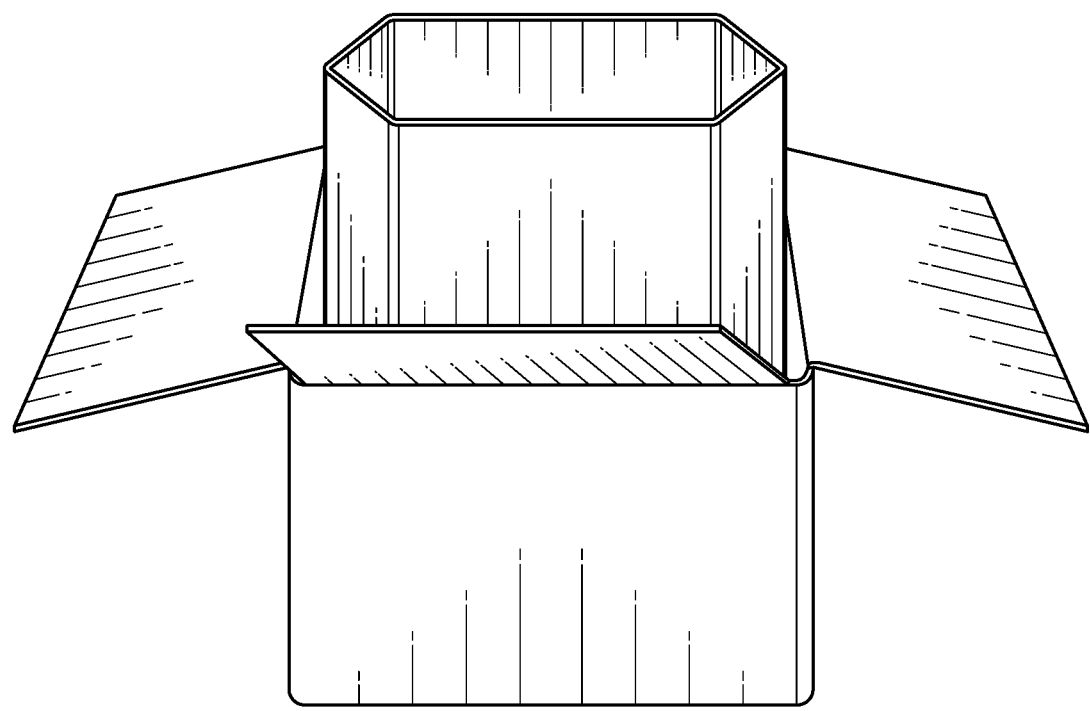
FIG. 8 depicts an isometric view of a disclosed embodiment with box wings retracted and fully disposed within a box

FIG. 7 depicts a disclosed embodiment fully inserted into a box.

With respect to the void that helps to define the box wing, the slot may be half of the width of the box. Since a 5 inch slot will equal a 10 inch wing, the approximate size of the box. If cut shorter, a gusset may be formed that will allow the sleeve to hold a small amount of fluid. Such fluid would remain in the box so long as the box is approximately level. The thickness of the insulation may be made of any thickness. Other proportions are subject to change to comport with the needs of the shipper and/or container.

What is claimed is:

1. A shipping sleeve system comprising:
  a) a sleeve structure configured to be inserted into a container, the sleeve structure comprising a lower fold assembly;
  b) the sleeve structure having a first end comprising upper edges with the upper edges defining an upper void;
  c) the sleeve structure having a second end comprising a bottom fold;
  d) the second end of the sleeve structure defining two box wing voids to form two box wings;
  wherein in a self-supporting position of the sleeve structure, the two box wings are configured to be disposed in a flat position in a plane perpendicular to a main body, thereby making a leak-proof sleeve structure with the upper void.

2. The shipping sleeve system of claim 1, wherein the two box wings, in a folded position of the sleeve structure when inserted into the container, are folded upwardly toward the first end of the sleeve structure.

3. The shipping sleeve system of claim 1, comprising a polyester fill encased in a clear membrane.

4. The shipping sleeve system of claim 1, comprising polyester that achieves a number "1" value in recycling.

5. The shipping sleeve system of claim 1, comprising virgin polyester.

6. The shipping sleeve system of claim 1, comprising a virgin polyester fill encased in a clear membrane, the clear membrane comprising virgin polyester.

* * * * *